US011424075B2

(12) United States Patent
Hashimoto

(10) Patent No.: US 11,424,075 B2
(45) Date of Patent: Aug. 23, 2022

(54) MULTILAYER ELECTRONIC COMPONENT AND METHOD FOR MANUFACTURING MULTILAYER ELECTRONIC COMPONENT

(71) Applicant: Murata Manufacturing Co., Ltd., Nagaokakyo (JP)

(72) Inventor: Hideyuki Hashimoto, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 58 days.

(21) Appl. No.: 16/909,153

(22) Filed: Jun. 23, 2020

(65) Prior Publication Data
US 2020/0411242 A1    Dec. 31, 2020

(30) Foreign Application Priority Data

Jun. 28, 2019    (JP) .............................. JP2019-121519
May 22, 2020   (JP) .............................. JP2020-089482

(51) Int. Cl.
*C04B 35/468* (2006.01)
*C04B 35/64* (2006.01)
(Continued)

(52) U.S. Cl.
CPC ....... *H01G 4/1227* (2013.01); *C04B 35/4682* (2013.01); *C04B 35/64* (2013.01); *H01G 4/012* (2013.01); *H01G 4/30* (2013.01)

(58) Field of Classification Search
CPC ..... B32B 18/00; C04B 35/4682; C04B 35/64; C04B 35/468; C04B 2235/3224;
(Continued)

(56) References Cited

U.S. PATENT DOCUMENTS 3,920,781 A * 11/1975 Eror .................... H01G 4/1227
                                                    361/321.5
9,287,046 B2    3/2016 Morita et al.
(Continued)

FOREIGN PATENT DOCUMENTS

CN    1634800 A    7/2005
CN    101765894 A   6/2010
(Continued)

OTHER PUBLICATIONS

Definition-of-divalent-cation_Helmenstine_1 page_May 2019.*
(Continued)

*Primary Examiner* — Timothy J Thompson
*Assistant Examiner* — Guillermo J Egoavil
(74) *Attorney, Agent, or Firm* — ArentFox Schiff LLP

(57) ABSTRACT

A multilayer electronic component having a plurality of stacked dielectric layers and a plurality of internal electrode layers. Each of the dielectric layers has a plurality of crystal grains including a perovskite-type compound containing Ba, a first rare earth element and a second rare earth element. A difference between a positive trivalent ion radius of the first rare earth element and a positive divalent ion radius of Ba is smaller than a difference between a positive trivalent ion radius of the second rare earth element and the positive divalent ion radius of Ba. A sum of an amount of the first rare earth element and the second rare earth element in a first region along a grain boundary is larger than a sum of an amount of the first rare earth element and the second rare earth element in a second region in a center portion of the crystal grain.

11 Claims, 9 Drawing Sheets

(51) Int. Cl.
*H01G 4/012* (2006.01)
*H01G 4/12* (2006.01)
*H01G 4/30* (2006.01)

(58) Field of Classification Search
CPC .......... C04B 2237/346; C04B 2237/58; C04B 2237/704; H01G 4/012; H01G 4/12; H01G 4/1227; H01G 4/30
USPC ...... 361/321.4, 306.3, 321.2, 321.5; 174/260
See application file for complete search history.

(56) References Cited

U.S. PATENT DOCUMENTS

| | | | |
|---|---|---|---|
| 10,147,546 | B2 | 12/2018 | Morita et al. |
| 2009/0086407 | A1 | 4/2009 | Takahashi et al. |
| 2009/0225494 | A1* | 9/2009 | Yamazaki ......... C04B 35/62815 156/89.14 |
| 2010/0014214 | A1 | 1/2010 | Yamazaki et al. |
| 2010/0188797 | A1 | 7/2010 | Yamazaki et al. |
| 2012/0250221 | A1 | 10/2012 | Yamashita |
| 2013/0094121 | A1 | 4/2013 | Endo et al. |
| 2015/0036264 | A1 | 2/2015 | Morita |
| 2016/0217924 | A1 | 7/2016 | Morita et al. |
| 2017/0365410 | A1 | 12/2017 | Morita et al. |
| 2018/0182557 | A1 | 6/2018 | Park et al. |
| 2018/0294098 | A1 | 10/2018 | Inoue |
| 2019/0233948 | A1 | 8/2019 | Wang et al. |
| 2020/0258684 | A1 | 8/2020 | Yun et al. |

FOREIGN PATENT DOCUMENTS

| | | | | |
|---|---|---|---|---|
| CN | 103553591 | A | | 2/2014 |
| JP | 2005029423 | A | * 2/2005 | ............. C04B 35/46 |
| JP | 2013157460 | A | | 8/2013 |
| JP | 2013229551 | A | | 11/2013 |
| JP | 2017228590 | A | | 12/2017 |
| JP | 2018181940 | A | | 11/2018 |
| KR | 1020090011028 | A | | 1/2009 |
| KR | 1020090033099 | A | | 4/2009 |
| KR | 20120080657 | A | | 7/2012 |
| KR | 20130040708 | A | | 4/2013 |

OTHER PUBLICATIONS

Rare Earth Elements Ionic Radius_Shannon_p. 1_1976.*
Structure & Dielectric Properties of Perovskite BaTiO3_Hsio-Lin_ pp. 1-15_Dec. 2002.*
Korean Office Action issued for Korean Application No. 10-2020-0072713, date of dispatch Nov. 3, 2021.
Korean Office Action issued for Korean Application No. 10-2020-0075437, date of dispatch Nov. 24, 2021.
Korean Office Action issued for Korean Application No. 10-2020-0076266, date of dispatch Nov. 24, 2021.
BariumTitanate_pp. 49 to 104_1999.
Gong, H. et al.; "Interfacial Diffusion Behavior In Ni—BaTiO3 MLCCs with Ultra-Thin Active Layers"; Electron. Mater. Lett., vol. 10, No. 2 (2014), pp. 417-421.
Li, L, et al.; "Synthesis & Characterization of X8R BaTiO3-based dielectric ceramics by doping with NiNb2O6 nanopowders"; J Mater Sci: Mater Electron (2015) 26: pp. 9522-9528.
Dionot, J.; "Topology of Ferroelectric Polarization at the BaTiO3 (001) surface from ab initio calculations and electron microscopy-spectroscopy";pp. 1-154_Dec. 2015.
Oyama, T. et al.; "Trapping of oxygen vacancy at grain boundary and its correlation with local atomic configuration and resultant excess energy in barium titanate: A systematic computational analysis"; Physical Review B 82, (2010), pp. 134107-1 to 134107-10.
Chinese Office Action issued for Chinese Application No. 202010583658.5, date of issuance Aug. 4, 2021.
Wu, Wanghua et al.; "Thermally stimulated depolarization current study on barium titanate single crystals"; AIP Advances, 8, 045005-1 to 045005-6, Apr. 2018.
Lee, Jae-Young et al.; "Coating BaTiO3 Nanolayers on Spherical Ni Powders for Multilayer Ceramic Capacitors"; Advanced Materials, Oct. 2003, 15, No. 19, pp. 1655-1658.
Barium Titanate_pp. 49 to 104_Sep. 2007.

* cited by examiner

Gd (FIRST RARE EARTH ELEMENT $Re_1$)
Dy (SECOND RARE EARTH ELEMENT $Re_2$)
R1: FIRST REGION
R2: SECOND REGION

MULTILAYER ELECTRONIC COMPONENT AND METHOD FOR MANUFACTURING MULTILAYER ELECTRONIC COMPONENT

CROSS REFERENCE TO RELATED APPLICATIONS

The present application claims priority to Japanese Patent Application No. 2019-121519, filed Jun. 28, 2019, and claims priority to Japanese Patent Application No. 2020-089482, filed May 22, 2020, the entire contents of each of which are incorporated herein by reference.

BACKGROUND OF THE INVENTION

Field of the Invention

The present disclosure relates to a multilayer electronic component and a method for manufacturing a multilayer electronic component.

Description of the Background Art

In recent years, a multilayer electronic component such as a multilayer ceramic capacitor has been increasingly applied to an electronic device such as a vehicle-mounted device that requires high reliability. The reliability of the multilayer electronic component can be evaluated based on, for example, the length of time (hereinafter, may be simply referred to as "lifetime") required for insulation resistance to decrease to a predetermined value in a high temperature load test.

One example of the multilayer electronic component is a multilayer ceramic capacitor described in Japanese Patent Laying-Open No. 2013-229551 (PTL 1). The multilayer ceramic capacitor described in PTL 1 includes dielectric layers containing $BaTiO_3$ and a rare earth element Re.

SUMMARY OF THE INVENTION

In order to improve the reliability of a multilayer ceramic capacitor including dielectric layers containing $BaTiO_3$, it is necessary to reduce or prevent the movement of oxygen vacancies within the dielectric layers during application of a DC voltage. In order to improve the reliability, it is said to be effective to replace $Ba^{2+}$, which is a positive divalent ion of Ba in a crystal lattice of $BaTiO_3$, with $Re^{3+}$, which is a positive trivalent ion of rare earth element Re (hereinafter, the ions may be described in accordance with the foregoing).

The replacement of $Ba^{2+}$ with $Re^{3+}$ creates excessive positive charges. As a result, Ba vacancies regarded as being relatively negative-divalently charged are formed to satisfy an electrically neutral condition. These Ba vacancies form stable vacancy pairs with oxygen vacancies that can be regarded as being relatively positive-divalently charged. Since the Ba vacancies do not move easily even when a DC voltage is applied, the oxygen vacancies captured by the Ba vacancies also do not move easily.

As a difference between an ion radius of $Ba^{2+}$ and an ion radius of $Re^{3+}$ becomes smaller, the replacement of $Ba^{2+}$ with $Re^{3+}$ becomes easier during sintering of the dielectric layers. However, if the replacement of $Ba^{2+}$ with $Re^{3+}$ becomes excessive, the Ba vacancies are formed excessively. Therefore, during sintering of the dielectric layers, the $BaTiO_3$ particles become more active on the surfaces thereof and are readily "necked" together.

This leads to easy grain growth, and as a result, the ceramic structure of the sintered dielectric layers may become uneven. When a DC voltage is applied to the dielectric layers, local concentration of the electric field may occur due to the unevenness of the ceramic structure. This may result in a reduction in reliability.

In contrast, when the difference between the ion radius of $Ba^{2+}$ and the ion radius of $Re^{3+}$ is large, the replacement of $Ba^{2+}$ with $Re^{3+}$ is difficult during sintering of the dielectric layers. As a result, $Re^{3+}$ is locally present in grain boundaries of crystal grains that form the sintered dielectric layers. In this case, the above-described effect of reducing or preventing the movement of the oxygen vacancies by the Ba vacancies may become insufficient and the effect of improving the reliability cannot be obtained in some cases.

When $Re^{3+}$ is locally present in the grain boundaries of the crystal grains in some way, application of a DC voltage to the dielectric layers causes local concentration of the electric field in the portion where $Re^{3+}$ is locally present. This may result in a reduction in reliability.

That is, it is conceivable that the ion radius of $Re^{3+}$ in the dielectric layers affects the reliability of the multilayer ceramic capacitor. This is not, however, mentioned in PTL 1.

An object of the present disclosure is to provide a multilayer electronic component having high reliability, and a method for manufacturing the same.

A multilayer electronic component according to the present disclosure includes a multilayer body including a plurality of stacked dielectric layers and a plurality of internal electrode layers. Each of the plurality of dielectric layers has a plurality of crystal grains including a perovskite-type compound containing Ba, a first rare earth element and a second rare earth element. A difference between a positive trivalent ion radius of the first rare earth element and a positive divalent ion radius of Ba is smaller than a difference between a positive trivalent ion radius of the second rare earth element and the positive divalent ion radius of Ba.

At least a part of the plurality of crystal grains have a first region located along a grain boundary of a crystal grain and a second region located in a center portion of the crystal grain. A sum of an amount of the first rare earth element and an amount of the second rare earth element in the first region is larger than a sum of an amount of the first rare earth element and an amount of the second rare earth element in the second region.

A method for manufacturing a multilayer electronic component according to the present disclosure includes: obtaining a plurality of pre-sintered dielectric layers using a first powder, the first powder including a first perovskite-type compound powder containing Ba, and a compound of a first rare earth element; forming pre-sintered internal electrode layers on the pre-sintered dielectric layers using a paste for internal electrode layers, the paste for internal electrode layers including an electrically conductive powder and a second powder, the second powder including a second perovskite-type compound powder containing Ba, and a compound of a second rare earth element; obtaining a pre-sintered multilayer body by stacking the plurality of pre-sintered dielectric layers including the pre-sintered dielectric layers having the pre-sintered internal electrode layers formed thereon; and obtaining a multilayer body including a plurality of stacked dielectric layers and a plurality of internal electrode layers, by sintering the pre-sintered multilayer body.

A difference between a positive trivalent ion radius of the second rare earth element and a positive divalent ion radius of Ba is larger than a difference between a positive trivalent ion radius of the first rare earth element and the positive divalent ion radius of Ba. The obtaining a multilayer body includes causing a reaction between the first powder and the second powder and sintering the pre-sintered multilayer body such that each of the plurality of dielectric layers has a plurality of crystal grains including a perovskite-type compound containing Ba, the first rare earth element and the second rare earth element.

The multilayer electronic component according to the present disclosure can have high reliability. In addition, according to the method for manufacturing a multilayer electronic component of the present disclosure, a multilayer electronic component having high reliability can be manufactured.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
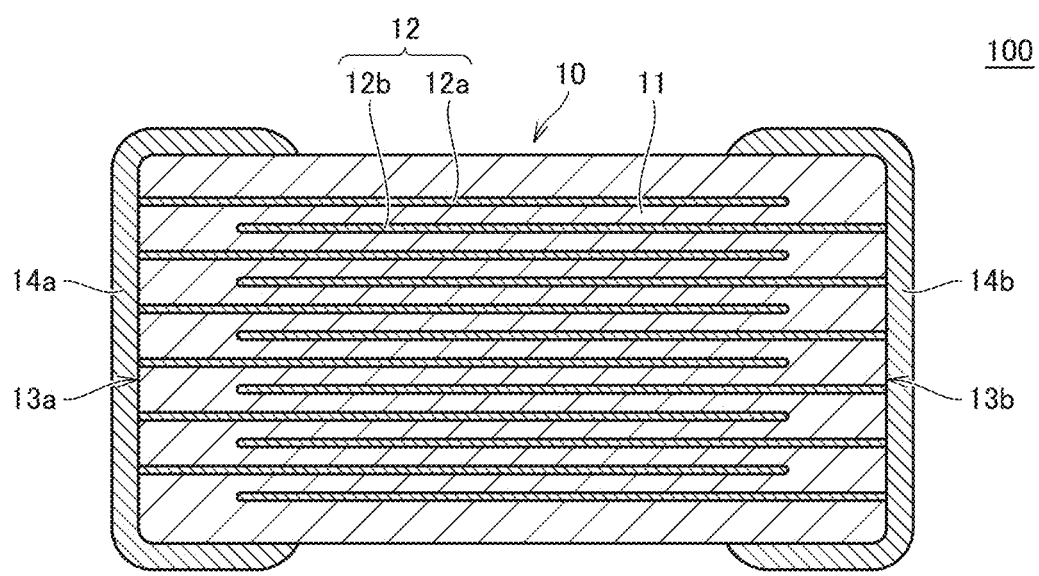
FIG. 1 is a cross-sectional view showing an example multilayer ceramic capacitor which is an embodiment of a multilayer electronic component according to the present disclosure.

Features of the present disclosure will be described with reference to the drawings. In an embodiment of a multilayer electronic component and a method for manufacturing the same described below, the same or common portions are designated by the same reference characters in the drawings and description thereof will not be repeated.

A multilayer ceramic capacitor which is an embodiment of a multilayer electronic component according to the present disclosure will be described with reference to FIGS. 1 to 6.

<Structure of Multilayer Ceramic Capacitor>

FIG. 1 is a cross-sectional view of a multilayer ceramic capacitor 100. Multilayer ceramic capacitor 100 includes a multilayer body 10. Multilayer body 10 has a first major surface and a second major surface that face each other in a layer stacking direction, a first side surface and a second side surface that face each other in a widthwise direction orthogonal to the layer stacking direction, and a first end surface 13a and a second end surface 13b that face each other in a lengthwise direction orthogonal to the layer stacking direction and the widthwise direction.

Multilayer body 10 includes a plurality of stacked dielectric layers 11 and a plurality of internal electrode layers 12. The plurality of dielectric layers 11 have outer layer portions and an inner layer portion. The outer layer portions are arranged between the first major surface of multilayer body 10 and internal electrode layer 12 closest to the first major surface and between the second major surface and internal electrode layer 12 closest to the second major surface. The inner layer portion is arranged in a region sandwiched between these two outer layer portions.

As described below, each of the plurality of dielectric layers 11 has a plurality of crystal grains including a perovskite-type compound containing Ba, a first rare earth element $Re_1$ and a second rare earth element $Re_2$. Rare earth element Re is a general term of 17 elements in total of Sc, Y, La, Ce, Pr, Nd, Pm, Sm, Eu, Gd, Tb, Dy, Ho, Er, Tm, Yb, and Lu. Examples of the above-described perovskite-type compound include a perovskite-type compound obtained by replacing a part of $Ba^{2+}$ in a crystal lattice of $BaTiO_3$ with $Re_1^{3+}$ and $Re_2^{3+}$. A difference between an ion radius of $Re_1^{3+}$ and an ion radius of $Ba^{2+}$ is smaller than a difference between an ion radius of $Re_2^{3+}$ and the ion radius of $Ba^{2+}$.

That is, first rare earth element $Re_1$ and second rare earth element $Re_2$ have a relative relationship. For example, first rare earth element $Re_1$ is Gd. In this case, second rare earth element $Re_2$ can be, for example, Tb, Dy, Ho, or Er having a difference from the ion radius of $Ba^{2+}$ larger than a difference between an ion radius of $Gd^{3+}$ and the ion radius of $Ba^{2+}$, i.e., having an ion radius smaller than the ion radius of $Gd^{3+}$. When first rare earth element $Re_1$ is Sm, second rare earth element $Re_2$ can be, for example, Eu or Gd. When first rare earth element $Re_1$ is Dy, second rare earth element $Re_2$ can be, for example, Ho or Er.

Each of the plurality of internal electrode layers 12 has a first internal electrode layer 12a and a second internal electrode layer 12b. First internal electrode layer 12a includes an electrode facing portion that faces second internal electrode layer 12b with dielectric layer 11 being interposed, and a lead electrode portion extending from the electrode facing portion to first end surface 13a of multilayer body 10. Second internal electrode layer 12b includes an electrode facing portion that faces first internal electrode layer 12a with dielectric layer 11 being interposed therebetween, and a lead electrode portion extending from the electrode facing portion to second end surface 13b of multilayer body 10.

First internal electrode layer 12a and second internal electrode layer 12b face each other with dielectric layer 11 being interposed therebetween, to thereby form one capacitor. Multilayer ceramic capacitor 100 can be described as the one formed by connecting a plurality of capacitors in parallel through a first external electrode 14a and a second external electrode 14b described below.

Internal electrode layer 12 includes an electrically conductive material. Examples of the electrically conductive material for internal electrode layer 12 include at least one type of metal selected from Ni, Cu, Ag, Pd and the like, or an alloy including the metal. Internal electrode layer 12 may further include dielectric particles called "co-material" as described below. The co-material is added to bring the sintering shrinkability of internal electrode layer 12 closer to the sintering shrinkability of dielectric layer 11 during sintering of multilayer body 10, and a material therefor is not particularly limited as long as it provides the above-mentioned effect.

Multilayer ceramic capacitor 100 further includes first external electrode 14a and second external electrode 14b. First external electrode 14a is formed on first end surface 13a of multilayer body 10 so as to be electrically connected to first internal electrode layers 12a. First external electrode 14a extends from first end surface 13a to the first and second major surfaces and the first and second side surfaces. Second external electrode 14b is formed on second end surface 13b of multilayer body 10 so as to be electrically connected to second internal electrode layers 12b. Second external electrode 14b extends from second end surface 13b to the first and second major surfaces and the first and second side surfaces.

Each of first external electrode 14a and second external electrode 14b has, for example, an underlying electrode layer and a plating layer arranged on the underlying electrode layer. The underlying electrode layer includes, for example, at least one layer selected from a sintered material layer, an electrically conductive resin layer and a thin film metal layer.

The sintered material layer is formed by baking a paste including a glass powder and a metal powder, and includes a glass portion and a metal portion. Examples of glass that constitutes the glass portion include $B_2O_3$—$SiO_2$—BaO-based glass and the like. Examples of metal that constitutes the metal portion include at least one type of metal selected from Ni, Cu, Ag and the like, or an alloy including the metal. A plurality of sintered material layers having different components may be formed. In a manufacturing method described below, the sintered material layer may be fired simultaneously with multilayer body 10, or may be baked after multilayer body 10 is fired.

The electrically conductive resin layer includes, for example, electrically conductive particles such as fine metal particles, and a resin portion. Examples of metal that constitutes the fine metal particles include at least one type of metal selected from Ni, Cu, Ag and the like, or an alloy including the metal. Examples of resin that constitutes the resin portion include an epoxy-based thermosetting resin and the like. A plurality of electrically conductive resin layers having different components may be formed.

The thin film metal layer is formed by, for example, a thin film forming method such as sputtering or vapor deposition, and is a layer having a thickness of not more than 1 μm and having fine metal particles deposited thereon. Examples of metal that constitutes the thin film metal layer include at least one type of metal selected from Ni, Cu, Ag, Au and the like, or an alloy including the metal. A plurality of thin film metal layers having different components may be formed.

Examples of metal that constitutes the plating layer include at least one type of metal selected from Ni, Cu, Ag, Au, Sn and the like, and an alloy including the metal. A plurality of plating layers having different components may be formed. The plating layer is preferably composed of a Ni-plating layer and a Sn-plating layer. The Ni-plating layer can prevent the underlying electrode layer from being eroded by solder when the multilayer electronic component is mounted. The Sn-plating layer has good wettability to solder including Sn. Therefore, the Sn-plating layer can improve the mountability when the multilayer electronic component is mounted.

Each of first external electrode 14a and second external electrode 14b may be a plating layer directly provided on multilayer body 10 and directly connected to the above-described corresponding internal electrode layers. The plating layer preferably includes a first plating layer and a second plating layer provided on the first plating layer.

Examples of metal that constitutes the first plating layer and the second plating layer include at least one type of metal selected from Cu, Ni, Sn, Au, Ag, Pd, Zn and the like, or an alloy including the metal. For example, when Ni is used as the metal that constitutes internal electrode layers 12, Cu having good bondability to Ni is preferably used as the metal that constitutes the first plating layer. When Sn or Au is used as the metal that constitutes internal electrode layers 12, a metal having solder barrier performance is preferably used as the metal that constitutes the first plating layer. In addition, Ni having good wettability to solder is preferably used as the metal that constitutes the second plating layer.

<Fine Structure of Dielectric Layer>

Dielectric layer 11 of multilayer ceramic capacitor 100 according to the present disclosure has the plurality of crystal grains including the perovskite-type compound containing Ba, first rare earth element $Re_1$ and second rare earth element $Re_2$. In order to examine a fine structure of the crystal grains, TEM observation and elemental mapping by the EDX were performed.

In the examination, a dielectric material in which $BaTiO_3$ is a basic structure of the perovskite-type compound and the perovskite-type compound contains Ba, Gd and Dy was used for dielectric layer 11. An ion radius of $Gd^{3+}$ is 1.053 angstrom, an ion radius of $Ba^{2+}$ is 1.42 angstrom, and an ion radius of $Dy^{3+}$ is 1.027 angstrom. Therefore, as described above, when Gd and Dy are selected as the rare earth elements, Gd is first rare earth element $Re_1$ and Dy is second rare earth element $Re_2$ based on the relationship of the ion radii of $Gd^{3+}$, $Dy^{3+}$ and $Ba^{2+}$.

Figure 2:
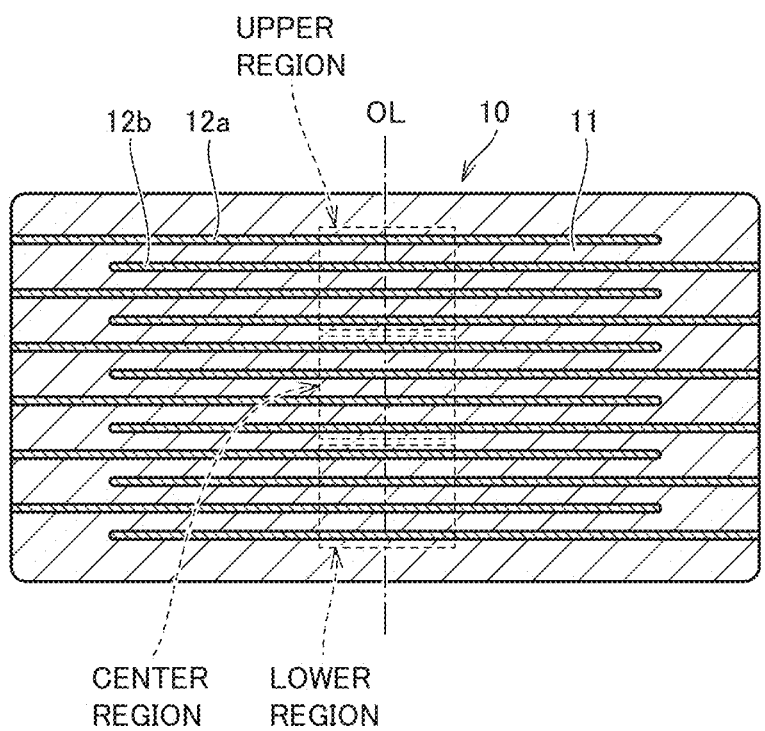
FIG. 2 is a cross-sectional view for illustrating a sample prepared to examine a fine structure of crystal grains in a dielectric layer of the multilayer ceramic capacitor shown in FIG. 1.

Sample production for TEM observation and EDX mapping will be described with reference to FIG. 2. FIG. 2 is a cross-sectional view for illustrating a sample prepared to examine the fine structure of the crystal grains in dielectric layer 11 of multilayer ceramic capacitor 100.

In accordance with the manufacturing method described below, multilayer body 10 of multilayer ceramic capacitor 100 was obtained. Multilayer body 10 was polished from the first side surface side and the second side surface side such that a center portion of multilayer body 10 in the widthwise direction was left, to thereby obtain a polished body. As shown in FIG. 2, an imaginary line OL orthogonal to internal electrode layers 12 was assumed in the vicinity of a center portion in the lengthwise direction. Then, for obtaining an electrostatic capacitance of the polished body, a region including a stack of dielectric layers 11, first internal electrode layers 12a and second internal electrode layers 12b was divided into three equal parts, i.e., an upper region, a center region and a lower region, in the layer stacking direction along imaginary line OL. In FIG. 2, the upper region, the center region and the lower region are shown by a broken line.

The upper region, the center region and the lower region were cut out of the polished body and thinned, to thereby obtain three thin film samples of the respective regions. Each of the three thin film samples includes dielectric layer 11. The three thin film samples of the upper region, the center region and the lower region of multilayer body 10 obtained as described above were subjected to TEM observation and elemental mapping by the EDX attached to the TEM.

Figure 3:
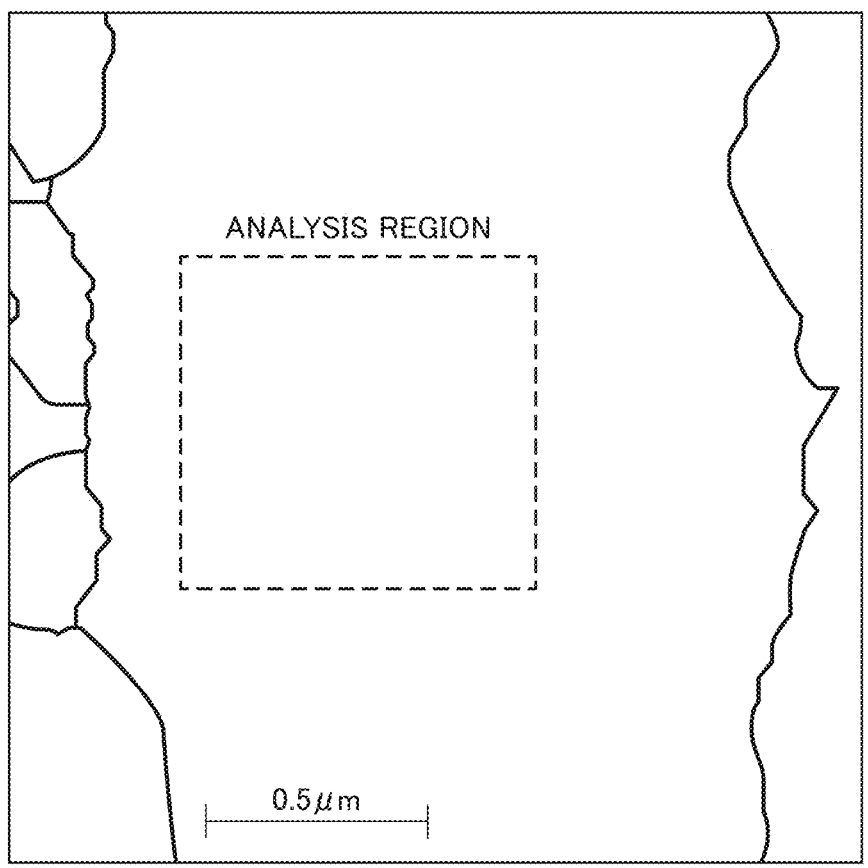
FIG. 3 is a schematic view of a transmission electron microscope (hereinafter, may be abbreviated as "TEM") observation image of a dielectric layer in a center region in FIG. 2.

FIG. 3 is a schematic view of a TEM observation image of the dielectric layer in the center region in FIG. 2. A region shown by a broken line in FIG. 3 represents a portion of EDX mapping analysis described below. The TEM observation image and the EDX mapping image did not have any significant difference among the upper region, the lower region and the center region. Therefore, a result obtained from the center region described below is regarded as a fine structure of dielectric layer 11 of multilayer ceramic capacitor 100 according to the present disclosure.

Dielectric layer 11 has a thickness of about 1.5 μm and an average grain diameter of the crystal grains obtained as an average value of an equivalent circular diameter by image analysis is about 0.13 μm. A grain boundary GB of a crystal grain G was visually determined from the TEM observation image.

Figure 4:
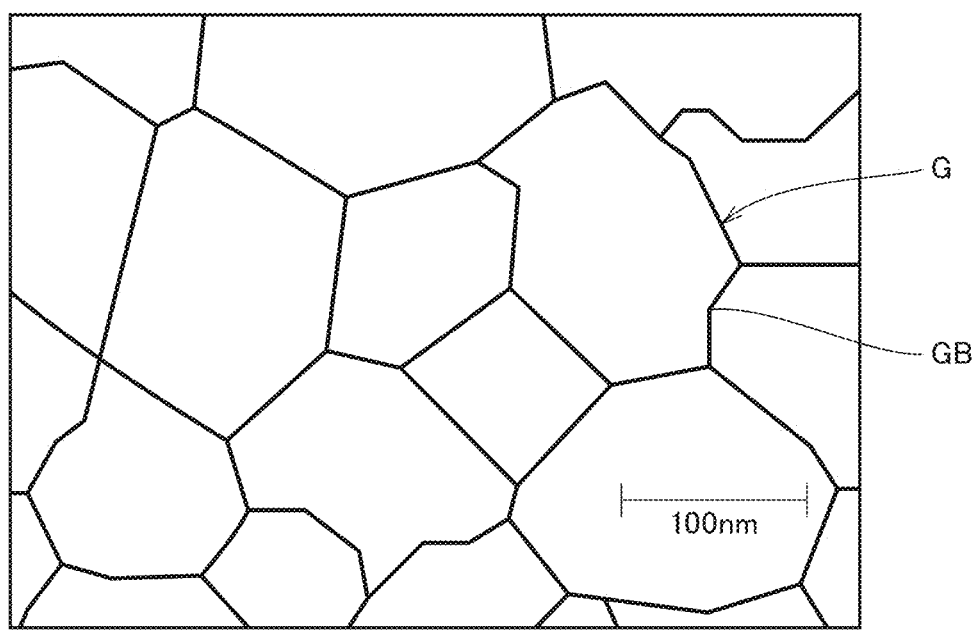
FIG. 4 is a schematic view of a TEM observation image showing the region indicated by a broken line in FIG. 3 in an enlarged view to clearly illustrate a grain boundary GB of a crystal grain G.
Figure 5:
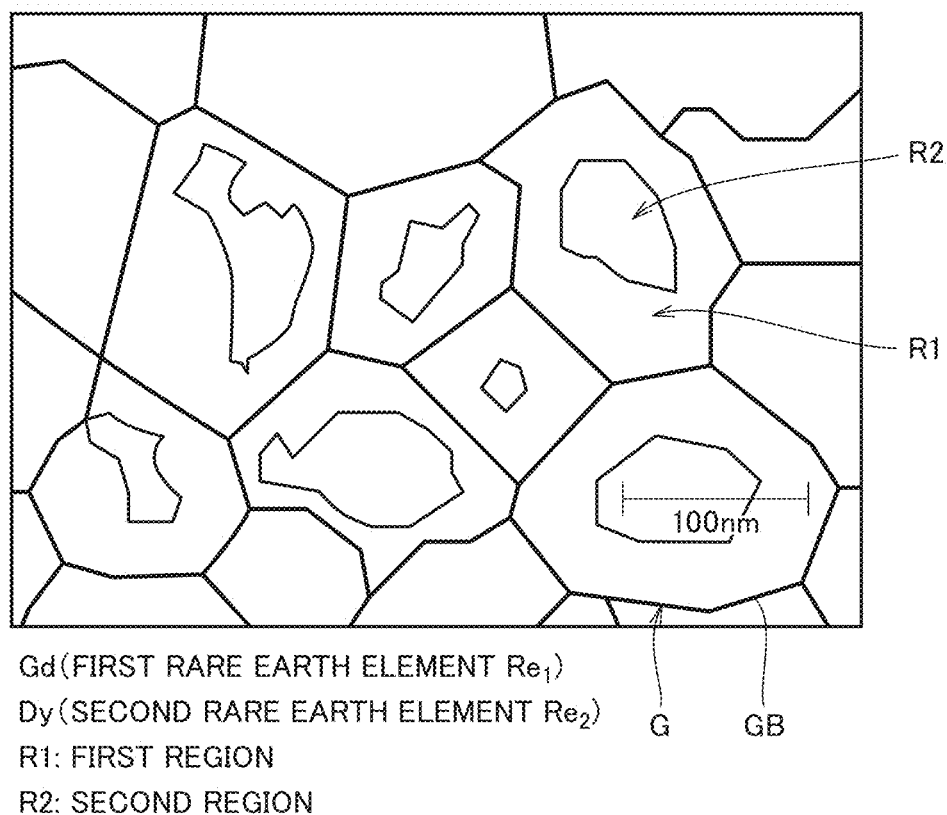
FIG. 5 is a schematic view of a mapping image of rare earth elements by energy dispersive X-ray spectroscopy (hereinafter, may be abbreviated as "EDX") in the region shown in FIG. 4.

FIG. 4 is a schematic view of a TEM observation image showing the region indicated by a broken line in FIG. 3 in an enlarged view to clearly illustrate grain boundary GB of crystal grain G. FIG. 5 is a schematic view of a mapping image of the rare earth elements by the EDX in the region shown in FIG. 4. FIG. 5 shows the region where Gd and Dy are detected as the rare earth elements.

The plurality of crystal grains G can be broadly divided into a first region R1 located along grain boundary GB of crystal grain G, and a second region R2 located in a center portion of crystal grain G. In the mapping image of the rare earth elements shown in FIG. 5, a sum of an amount (atm %) of Gd and an amount (atm %) of Dy when an amount of Ti is defined as 100 atm % is calculated, and a region where the sum is not less than 2 atm % is defined as first region R1 and a region where the sum is less than 2 atm % is defined as second region R2. The sum of the amount (atm %) of Gd and the amount (atm %) of Dy in first region R1 is larger than the sum of the amount (atm %) of Gd and the amount (atm %) of Dy in second region R2. Each of the amounts of Gd and Dy included in second region R2 is preferably not more than the detection sensitivity of the EDX excluding background noise.

That is, in dielectric layer 11 of multilayer ceramic capacitor 100, Gd and Dy are not locally present only in grain boundary GB of crystal grain G but are present throughout the first region R1. That is, it is estimated that there are an appropriate amount of Ba vacancies due to replacement of $Ba^{2+}$ with $Gd^{3+}$ and $Dy^{3+}$. Therefore, the above-described structure can reduce or prevent the movement of the oxygen vacancies by the Ba vacancies when a DC voltage is applied to dielectric layer 11.

It is conceivable that the above-described distribution of Gd and Dy is promoted by the fact that Gd and Dy are contained in a solid solution state in crystal grain G such that $Ba^{2+}$ is first replaced with $Gd^{3+}$ having an ion radius close to that of $Ba^{2+}$ and then $Dy^{3+}$ fills a Ba vacancy formed as a result of the replacement. When $Dy^{3+}$ fills the Ba vacancy, a new Ba vacancy is formed to satisfy an electrically neutral condition. When the amount of Dy is smaller than the amount of Gd, only the replacement of $Ba^{2+}$ with $Gd^{3+}$ occurs, depending on crystal grain G. Therefore, only Gd may be present as a rare earth element in one crystal grain G, or only Dy may be present as a rare earth element in one crystal grain G.

In addition, in dielectric layer 11 of multilayer ceramic capacitor 100, the rare earth elements are not uniformly contained in a solid solution state throughout the crystal grain G. That is, it is estimated that the excessive formation of Ba vacancies due to excessive replacement of $Ba^{2+}$ with $Gd^{3+}$ and $Dy^{3+}$ is reduced or prevented. Therefore, the above-described structure can inhibit the $BaTiO_3$ particles from becoming excessively active on the surfaces thereof during sintering of the dielectric layers.

Therefore, grain growth due to excessive necking between the $BaTiO_3$ particles can be reduced or prevented, and unevenness of the ceramic structure of the sintered dielectric layers can be reduced or prevented. As a result, the above-described structure can reduce or prevent local concentration of the electric field due to the unevenness of the ceramic structure when a DC voltage is applied to the dielectric layers.

As described above, multilayer ceramic capacitor 100 can sufficiently provide the effect of reducing or preventing the movement of the oxygen vacancies by the Ba vacancies in dielectric layer 11, and can reduce or prevent local concentration of the electric field due to locally present $Re^{3+}$. Therefore, multilayer ceramic capacitor 100 can have high reliability.

Figure 6:
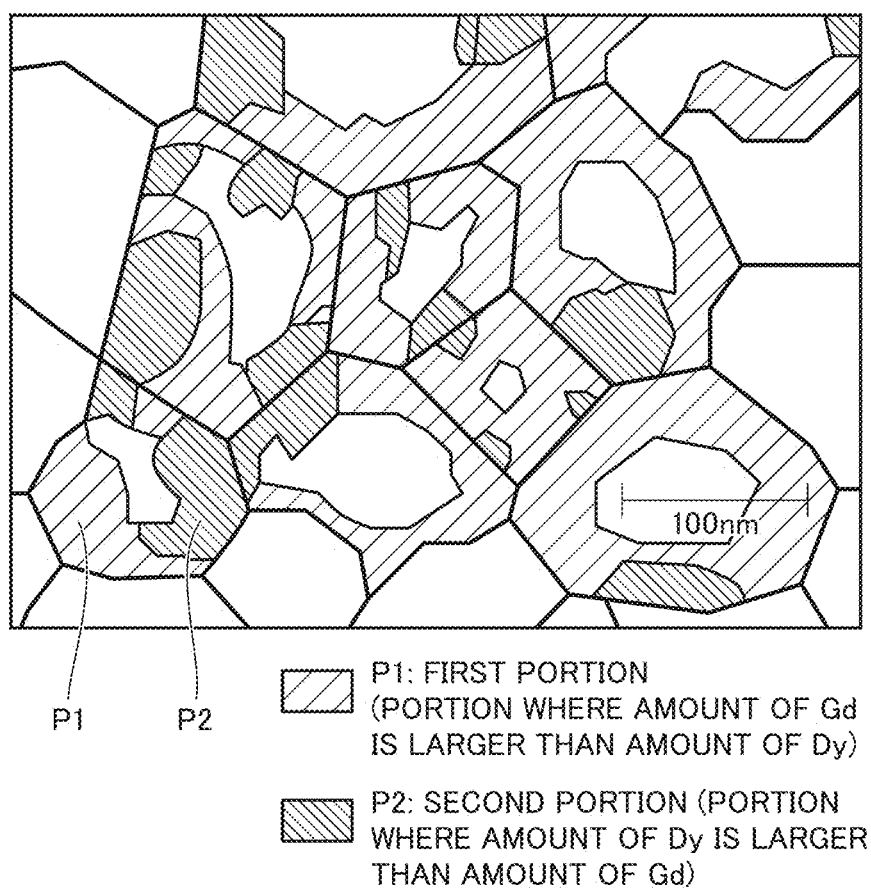
FIG. 6 is a schematic view of a distribution of Gd and Dy in crystal grain G in the region shown in FIG. 5.

Furthermore, examination of a distribution of Gd and Dy was performed on a portion of first region R1 where the sum (atm %) of the amount of Gd and the amount of Dy is at least 1.2 times as large as that in the second region. FIG. 6 is a schematic view of a distribution of Gd and Dy in crystal grain G in the region shown in FIG. 5. As shown in FIG. 6, first region R1 in the above-described structure preferably includes a first portion P1 where the amount of Gd, which is first rare earth element $Re_1$, is larger than the amount of Dy, which is second rare earth element $Re_2$, and a second portion P2 where the amount of Dy is larger than the amount of Gd.

As described above, solid solution of $Gd^{3+}$ in crystal grain G is more likely to progress based on the relationship of the ion radii of $Gd^{3+}$ and $Ba^{2+}$. In contrast, solid solution of $Dy^{3+}$ in crystal grain G is less likely to progress than that of $Gd^{3+}$. That is, when first region R1 includes the above-described two portions, it is estimated that the replacement of $Ba^{2+}$ with $Gd^{3+}$ occurs along entire grain boundaries GB of the plurality of crystal grains G and an appropriate amount of Ba vacancies are formed, and then, $Dy^{3+}$ fills a part of the Ba vacancies.

Therefore, when first region R1 is divided into first portion P1 and second portion P2, it is estimated that there are Ba vacancies along entire grain boundaries GB of crystal grains G, and thus, the movement of the oxygen vacancies can be effectively reduced or prevented. It is also possible to effectively inhibit the $BaTiO_3$ particles from becoming excessively active on the surfaces thereof.

<Method for Manufacturing Multilayer Ceramic Capacitor>

Next, a method for manufacturing multilayer ceramic capacitor 100 showing an embodiment of the multilayer electronic component according to the present disclosure will be described in order of manufacturing steps. The method for manufacturing multilayer ceramic capacitor 100 includes the following steps.

The method for manufacturing multilayer ceramic capacitor 100 includes obtaining a plurality of ceramic green sheets using a powder (dielectric raw material powder) containing a $BaTiO_3$ powder and a Gd compound applied to a surface thereof. The powder (dielectric raw material powder) containing a $BaTiO_3$ powder and a Gd compound applied to a surface thereof corresponds to a first powder including a first perovskite-type compound powder containing Ba and a compound of a first rare earth element $Re_1$. The term "green" means "pre-sintered" and is used in that sense in the following description. The ceramic green sheet includes a binder component, in addition to the dielectric raw material powder. The binder component is not particularly limited.

The above-described dielectric raw material powder can be produced, for example, by applying an organic compound of Gd to a surface of a $BaTiO_3$ powder, and calcinating and burning the organic component, to thereby bring about a state in which Gd is applied to the surface of the $BaTiO_3$ powder in an oxide state. However, the dielectric raw material powder is not limited to the above-described state, and may be in a state of including the organic compound, or in a state of including the oxide and the organic compound. The above-described $BaTiO_3$ powder in the dielectric raw material powder may be a $BaTiO_3$ solid solution powder. The dielectric raw material powder may include a component other than Gd as an additive.

The $BaTiO_3$ powder can be obtained, for example, by calcinating a mixture of a $BaCO_3$ powder and a $TiO_2$ powder. Alternatively, a $BaTiO_3$ powder made by a known method such as an oxalic acid method or a hydrothermal synthesis method may be used.

The method for manufacturing multilayer ceramic capacitor 100 includes printing internal electrode layer patterns on the ceramic green sheets. A paste for internal electrode layers includes, for example, a Ni powder, a powder (co-material) containing a $BaTiO_3$ powder and a Dy compound applied to a surface thereof, and a binder component. The binder component is not particularly limited. The printing internal electrode layer patterns on the ceramic green sheets corresponds to forming pre-sintered internal electrode layers on the pre-sintered dielectric layers using a paste for internal electrode layers.

The Ni powder, and the powder (co-material) containing a $BaTiO_3$ powder and a Dy compound applied to a surface thereof correspond to an electrically conductive powder, and a second powder including a second perovskite-type compound powder containing Ba and a compound of a second rare earth element $Re_2$, respectively.

A difference between an ion radius of $Gd^{3+}$ and an ion radius of $Ba^{2+}$ is smaller than a difference between an ion radius of $Dy^{3+}$ and the ion radius of $Ba^{2+}$. That is, first rare earth element $Re_1$ and second rare earth element $Re_2$ are selected based on such a relative relationship that a difference between the ion radius of $Re_1^{3+}$ and the ion radius of $Ba^{2+}$ is smaller than a difference between the ion radius of $Re_2^{3+}$ and the ion radius of $Ba^{2+}$.

The above-described co-material can be produced, for example, by applying an organic compound of Dy to a surface of a $BaTiO_3$ powder, and calcinating and burning the organic component, to thereby bring about a state in which Dy is applied to the surface of the $BaTiO_3$ powder in an oxide state. However, the co-material is not limited to the above-described state, and may be in a state of including the organic compound, or in a state of including the oxide and the organic compound. The above-described $BaTiO_3$ powder in the co-material may be a $BaTiO_3$ solid solution powder.

The $BaTiO_3$ solid solution powder used for the ceramic green sheets and the $BaTiO_3$ solid solution powder used for the paste for internal electrode layers may be the same as or different from each other. This powder may include a component other than Dy as an additive.

The method for manufacturing multilayer ceramic capacitor 100 includes obtaining a green multilayer body by stacking the plurality of ceramic green sheets including the ceramic green sheets having the internal electrode patterns formed thereon. This step corresponds to obtaining a pre-sintered multilayer body by stacking the plurality of pre-sintered dielectric layers including the pre-sintered dielectric layers having the pre-sintered internal electrode layers formed thereon.

The method for manufacturing multilayer ceramic capacitor 100 includes obtaining a multilayer body including a plurality of stacked dielectric layers and a plurality of internal electrode layers by sintering the green multilayer body.

The obtaining a multilayer body includes sintering the green multilayer body to have a plurality of crystal grains including a perovskite-type compound containing Ba, Gd and Dy. In this step of sintering, a reaction between the powder containing a $BaTiO_3$ powder and a Gd compound applied to a surface thereof and the powder containing a $BaTiO_3$ powder and a Dy compound applied to a surface thereof is caused to thereby obtain a sintered material that forms the dielectric layers. The powder containing a $BaTiO_3$ powder and a Gd compound applied to a surface thereof corresponds to the first powder, and the powder containing a $BaTiO_3$ powder and a Dy compound applied to a surface thereof corresponds to the second powder.

The above-described step of obtaining a green multilayer body to the above-described step of sintering the green multilayer body will be described in detail with reference to FIGS. 7 to 9.

Figure 7:
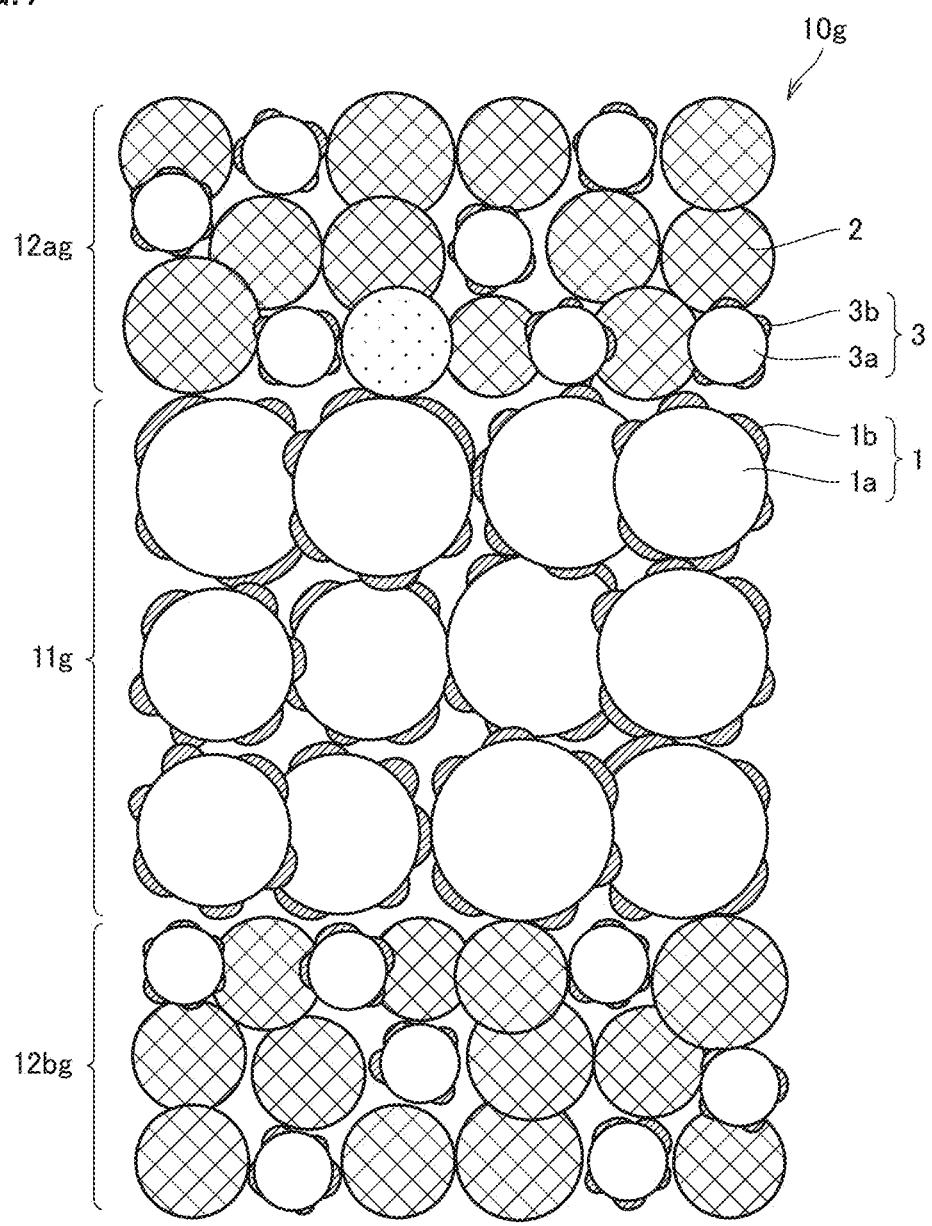
FIG. 7 is a cross-sectional view showing the step of obtaining a green multilayer body.
Figure 8:
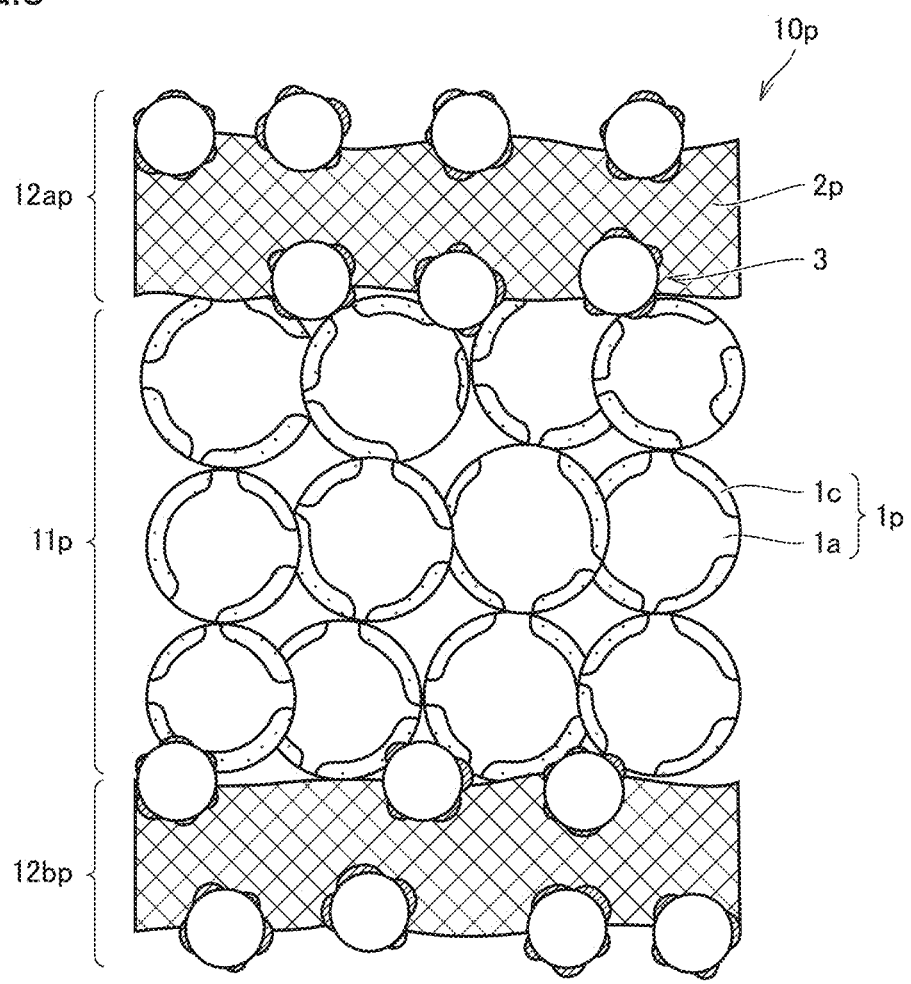
FIG. 8 is a cross-sectional view showing a semi-sintered multilayer body obtained by heating the green multilayer body.
Figure 9:
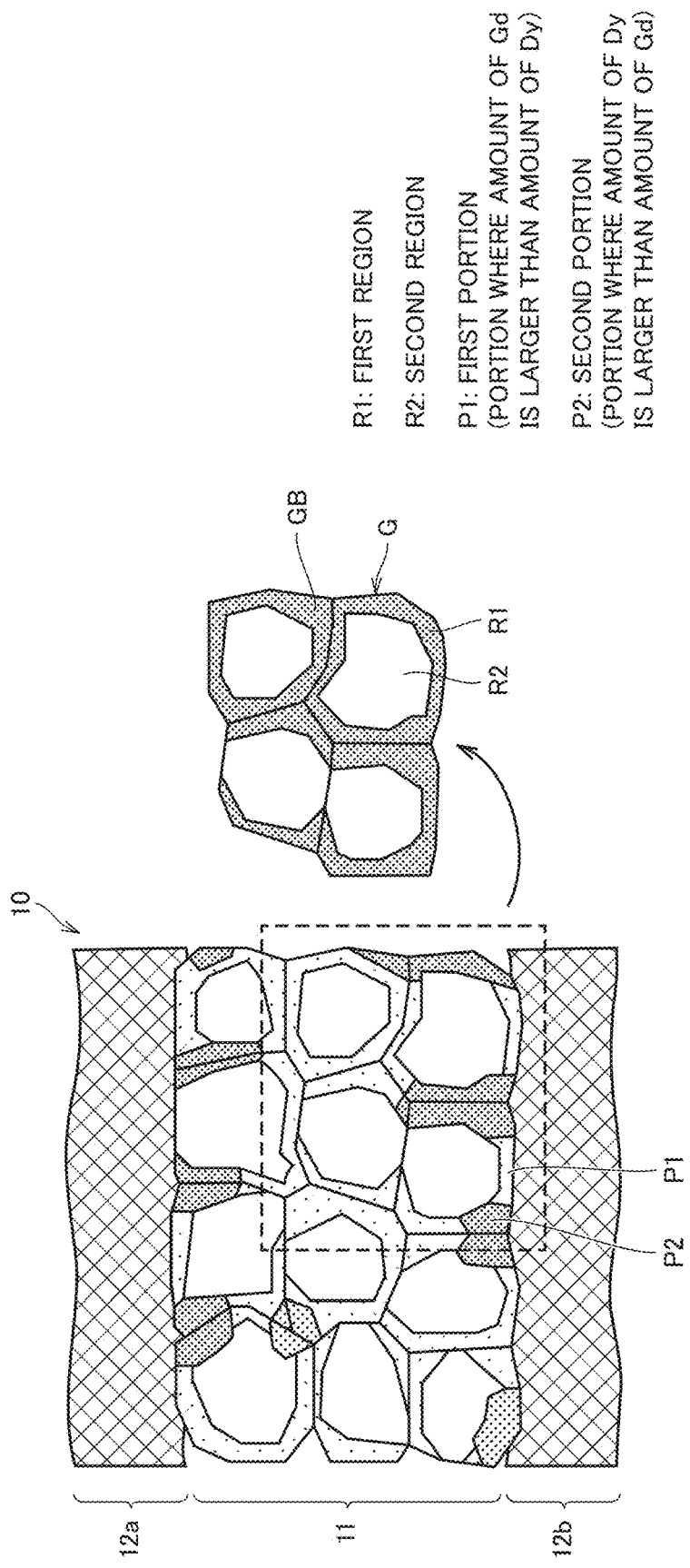
FIG. 9 is a cross-sectional view showing the step of obtaining a sintered multilayer body by further heating the semi-sintered multilayer body.

FIGS. 7 to 9 are cross-sectional views showing main portions of the steps of manufacturing multilayer body 10 included in multilayer ceramic capacitor 100 which is an embodiment of the multilayer electronic component according to the present disclosure. FIG. 7 is a cross-sectional view showing the step of obtaining a green multilayer body 10g. Green multilayer body 10g is obtained by stacking a ceramic green sheet 11g, a first internal electrode layer pattern 12ag and a second internal electrode layer pattern 12bg.

Ceramic green sheet 11g includes a powder 1 containing a $BaTiO_3$ powder 1a and a Gd compound 1b applied to a surface thereof. An average grain diameter of $BaTiO_3$ powder 1a by image analysis of a scanning electron microscope (SEM) observation image is about 100 nm. Powder 1 may include a component other than Gd as an additive. Ceramic green sheet 11g also includes a not-shown binder component, in addition to powder 1.

Each of first internal electrode layer pattern 12ag and second internal electrode layer pattern 12bg includes a Ni powder 2, and a powder 3 containing a $BaTiO_3$ powder 3a and a Dy compound 3b applied to a surface thereof. An average grain diameter of $BaTiO_3$ powder 3a by image analysis of the SEM observation image is about 10 nm. Powder 3 may include a component other than Dy as an additive. Each of first internal electrode layer pattern 12ag and second internal electrode layer pattern 12bg also includes a not-shown binder component, in addition to Ni powder 2 and powder 3.

FIG. 8 is a cross-sectional view showing a semi-sintered multilayer body 10p obtained by heating green multilayer body 10g to a temperature at which each internal electrode pattern is sintered. Semi-sintered multilayer body 10p includes a semi-sintered dielectric layer 11p, and a first semi-sintered internal electrode layer 12ap and a second semi-sintered internal electrode layer 12bp. In this state, Gd of Gd compound 1b applied to the surface of $BaTiO_3$ powder 1a is present within the surface of $BaTiO_3$ powder 1a in a solid solution state.

That is, $BaTiO_3$ powder 1a, a part of which is a Gd solid solution region 1c, forms a powder 1p. Semi-sintered dielectric layer 11p includes powder 1p. At this time, the binder component has already been decomposed and is hardly left in semi-sintered dielectric layer 11p.

Each of first semi-sintered internal electrode layer 12ap and second semi-sintered internal electrode layer 12bp includes a Ni semi-sintered material 2p and powder 3. When Ni powder 2 is sintered into Ni semi-sintered material 2p, powder 3 is excluded from Ni semi-sintered material 2p and moves to the vicinity of an interface with semi-sintered dielectric layer 11p.

FIG. 9 is a cross-sectional view showing the step of obtaining sintered multilayer body 10 by further heating semi-sintered multilayer body 10p to a temperature at which powder 1p is sintered. Multilayer body 10 includes dielectric layer 11, and first internal electrode layer 12a and second internal electrode layer 12b. In this state, a plurality of crystal grains G in dielectric layer 11 include first region R1 located along grain boundary GB of crystal grain G, and second region R2 located in a center portion of crystal grain G, as shown in FIG. 5. A sum of an amount of Gd and an amount of Dy in first region R1 is larger than a sum of an amount of Gd and an amount of Dy in second region R2.

In addition, as shown in FIG. 6, first region R1 includes first portion P1 where the amount of Gd, which is first rare earth element $Re_1$, is larger than the amount of Dy, which is second rare earth element $Re_2$, and second portion P2 where the amount of Dy is larger than the amount of Gd.

Multilayer ceramic capacitor 100 obtained in accordance with the above-described manufacturing method can sufficiently provide the effect of reducing or preventing the movement of the oxygen vacancies by the Ba vacancies in dielectric layers 11, and can reduce or prevent local concentration of the electric field due to locally present $Re^{3+}$. Therefore, multilayer ceramic capacitor 100 can have high reliability.

EXAMPLES

While the invention according to the present disclosure will be described more specifically below with reference to Examples and Comparative Examples, the invention according to the present disclosure is not limited to these examples.

Comparative Example 1

A multilayer ceramic capacitor was produced in accordance with the following procedure. First, a dielectric sheet and an electrically conductive paste for internal electrodes were prepared. The dielectric sheet and the electrically conductive paste for internal electrodes included an organic binder and a solvent. The dielectric sheet was produced using a dielectric raw material powder. The dielectric raw material powder included a $BaTiO_3$ powder and a compound of first rare earth element $Re_1$ shown in Table 1. An oxide was used as the compound. The compound of first rare earth element $Re_1$ was used such that an amount (atm %) of $Re_1$ included in the compound of first rare earth element $Re_1$ when an amount of Ti included in the $BaTiO_3$ powder was defined as 100 atm % was as shown in "amount of addition" in Table 1.

The electrically conductive paste for internal electrodes was printed on the dielectric sheet in a predetermined pattern and an internal electrode pattern was formed on the dielectric sheet. The predetermined number of dielectric sheets for an outer layer having no internal electrode pattern printed thereon were stacked, and then, the dielectric sheet having the internal electrode pattern printed thereon was stacked on those dielectric sheets for an outer layer, and then, the predetermined number of dielectric sheets for an outer layer were stacked on that dielectric sheet. A multilayer sheet was thus produced. The multilayer sheet was pressed in a layer stacking direction by hydrostatic pressing, to thereby obtain a multilayer block. The multilayer block was cut into a predetermined size, to thereby obtain a multilayer chip. At this time, a corner portion and a ridge portion of the multilayer chip were rounded by barrel polishing. The multilayer chip was sintered, to thereby obtain a multilayer body. A sintering temperature was preferably 900 to 1300° C., depending on the materials of the dielectric layer and the internal electrode. In this comparative example as well, the sintering temperature was within this range. An electrically conductive paste for external electrodes was applied to both end surfaces of the multilayer chip and baked, and the baked layers of external electrodes were thus formed. A baking temperature was preferably 700 to 900° C. In this comparative example as well, the baking temperature was within this range. The surfaces of the baked layers were subjected to plating.

Comparative Examples 2 to 6 and Examples 1 to 9

Multilayer ceramic capacitors were produced similarly to Comparative Example 1, except that a compound of first rare earth element $Re_1$ and a compound of second rare earth element $Re_2$ were used such that the types of first rare earth element $Re_1$ and second rare earth element $Re_2$ were as shown in Table 1 and the amounts (atm %) of first rare earth element $Re_1$ and second rare earth element $Re_2$ when the amount of Ti was defined as 100 atm % were as shown in "amount of addition" in Table 1. An oxide was used as each of the compound of first rare earth element $Re_1$ and the compound of second rare earth element $Re_2$.

[Measurement and Evaluation]
(1) Measurement of Fine Structure of Dielectric Layer A sample was produced from each multilayer ceramic capacitor in accordance with the above-described procedure, and a center region of the sample was subjected to TEM observation and elemental mapping by the EDX attached to the TEM. 10 crystal grains were selected from the crystal grains in a field of view and the number of crystal grains corresponding to specific crystal grains was counted. The result is shown in Table 1. The specific crystal grains refer to crystal grains having first region R1 where a sum of an amount (atm %) of a first rare earth element and an amount (atm %) of a second rare earth element when an amount of Ti is defined as 100 atm % is not less than 2 atm % in a mapping image of the rare earth elements, and second region R2 where the sum is less than 2 atm %.

(2) Measurement of Relative Permittivity

The multilayer ceramic capacitor was left in an oven of 150° C. for 60 minutes, and 24 hours after the multilayer ceramic capacitor was taken out from the oven, an electrostatic capacitance was measured (average value when measurement voltage=0.5 V, measurement frequency=1 kHz and n=30). Thereafter, the multilayer ceramic capacitor was polished along a ½ LT cross section and a ½ WT cross section, and an L direction effective electrode length and a W direction effective electrode length were obtained (average value when n=5, respectively). The (L direction effective electrode length)×(W direction effective electrode length) was defined as an effective electrode. In addition, a center portion of the ½ LT cross section was subjected to SEM observation, and a dielectric element thickness was obtained (average value of arbitrary 100 portions). Furthermore, a relative permittivity of the multilayer ceramic capacitor was calculated using the number of effective elements. The result is shown in Table 1.

(3) Evaluation of Reliability

A mean time to failure (MTTF) in a highly accelerated life test (HALT) in which 6 V was applied to the multilayer ceramic capacitor at 150° C. was measured. The result is shown in Table 1. The time when IR became equal to or less than $10^4$ was determined as a failure.

grains in a field of view and the number of crystal grains corresponding to specific crystal grains was counted. The result is shown in Table 2. The specific crystal grains refer to crystal grains having first region R1 where a sum of an amount (atm %) of a first rare earth element and an amount (atm %) of a second rare earth element when an amount of Ti is defined as 100 atm % is not less than 2 atm % in a mapping image of the rare earth elements, and second region R2 where the sum is less than 2 atm %.

TABLE 1

|  | First rare earth element Re$_1$ | | Second rare earth element Re$_2$ | | Number of specific crystal grains | Relative permittivity | MTTF (time) |
| --- | --- | --- | --- | --- | --- | --- | --- |
|  | type | amount of addition | type | amount of addition | | | |
| Comparative Example 1 | Gd | 1 | Dy | 0 | 0/10 | 3120 | 3.2 |
| Comparative Example 2 | Gd | 1 | Dy | 1 | 0/10 | 3020 | 3.5 |
| Example 1 | Gd | 2 | Dy | 1 | 4/10 | 2990 | 10.8 |
| Example 2 | Gd | 3 | Dy | 1 | 7/10 | 2980 | 17.3 |
| Example 3 | Gd | 5 | Dy | 1 | 9/10 | 2770 | 25.5 |
| Comparative Example 3 | Sm | 1 | Dy | 0 | 0/10 | 3250 | 2.7 |
| Comparative Example 4 | Sm | 1 | Dy | 1 | 0/10 | 3220 | 2.9 |
| Example 4 | Sm | 2 | Dy | 1 | 5/10 | 3220 | 10.5 |
| Example 5 | Sm | 3 | Dy | 1 | 9/10 | 3160 | 21.2 |
| Example 6 | Sm | 5 | Dy | 1 | 10/10 | 2900 | 23.5 |
| Comparative Example 5 | Dy | 1 | Er | 0 | 0/10 | 2980 | 3.2 |
| Comparative Example 6 | Dy | 1 | Er | 1 | 0/10 | 2870 | 3.1 |
| Example 7 | Dy | 2 | Er | 1 | 3/10 | 2800 | 13.7 |
| Example 8 | Dy | 3 | Er | 1 | 5/10 | 2750 | 25.7 |
| Example 9 | Dy | 5 | Er | 1 | 8/10 | 2630 | 30.9 |

Examples 10 to 24

Multilayer ceramic capacitors were produced similarly to Comparative Example 1, except that a compound of first rare earth element Re$_1$ and a compound of second rare earth element Re$_2$ were used such that the types of first rare earth element Re$_1$ and second rare earth element Re$_2$ were as shown in Table 2 and the amounts (atm %) of first rare earth element Re$_1$ and second rare earth element Re$_2$ when the amount of Ti was defined as 100 atm % were as shown in "amount of addition" in Table 2.

[Measurement and Evaluation]

(1) Measurement of Fine Structure of Dielectric Layer

A sample was produced from each multilayer ceramic capacitor in accordance with the above-described procedure, and a center region of the sample was subjected to TEM observation and elemental mapping by the EDX attached to the TEM. 10 crystal grains were selected from the crystal grains in a field of view and the number of crystal grains In addition, as for a portion of first region R1 where the sum (atm %) of the amount of first rare earth element Re$_1$ and the amount of second rare earth element Re$_2$ was at least 1.2 times as large as that in second region R2, area values of first portion P1 where the amount of first rare earth element Re$_1$ was larger than the amount of second rare earth element Re$_2$ and second portion P2 where the amount of second rare earth element Re$_2$ was larger than the amount of first rare earth element Re$_1$ were obtained. The result is shown in "P1/P2" in Table 2. The area values of first portion P1 and second portion P2 herein are values when an area of first region R1 as a whole is defined as 100.

(2) Measurement of Relative Permittivity

A relative permittivity of each multilayer ceramic capacitor was measured similarly to the foregoing. The result is shown in Table 2.

(3) Evaluation of Reliability

The MTTF was measured similarly to the foregoing. The result is shown in Table 2.

TABLE 2

|  | First rare earth element Re1 | | Second rare earth element Re2 | | Number of specific crystal grains | P1/P2 | Relative permittivity | MTTF (time) |
| --- | --- | --- | --- | --- | --- | --- | --- | --- |
|  | type | amount of addition | type | amount of addition | | | | |
| Example 10 | Gd | 3 | Dy | 1 | 7/10 | 100/0 | 2980 | 17.3 |
| Example 11 | Gd | 3 | Dy | 3 | 6/10 | 97/3 | 2900 | 21.3 |
| Example 12 | Gd | 3 | Dy | 5 | 8/10 | 94/6 | 2890 | 22.3 |
| Example 13 | Gd | 3 | Dy | 10 | 9/10 | 89/11 | 2810 | 23.5 |
| Example 14 | Gd | 2 | Dy | 10 | 8/10 | 85/15 | 2880 | 20.1 |

TABLE 2-continued

|  | First rare earth element Re1 | | Second rare earth element Re2 | | Number of specific crystal grains | P1/P2 | Relative permittivity | MTTF (time) |
|---|---|---|---|---|---|---|---|---|
|  | type | amount of addition | type | amount of addition |  |  |  |  |
| Example 15 | Sm | 3 | Dy | 1 | 9/10 | 100/0 | 3160 | 21.2 |
| Example 16 | Sm | 3 | Dy | 3 | 8/10 | 95/5 | 3120 | 25.3 |
| Example 17 | Sm | 3 | Dy | 5 | 9/10 | 93/7 | 3090 | 26.2 |
| Example 18 | Sm | 3 | Dy | 10 | 10/10 | 90/10 | 3080 | 27.2 |
| Example 19 | Sm | 2 | Dy | 10 | 9/10 | 81/19 | 3120 | 26.0 |
| Example 20 | Dy | 3 | Er | 1 | 5/10 | 100/0 | 2750 | 25.7 |
| Example 21 | Dy | 3 | Er | 3 | 5/10 | 97/3 | 2710 | 32.7 |
| Example 22 | Dy | 3 | Er | 5 | 6/10 | 95/5 | 2650 | 35.2 |
| Example 23 | Dy | 3 | Er | 10 | 6/10 | 89/11 | 2630 | 38.9 |
| Example 24 | Dy | 2 | Er | 10 | 5/10 | 88/12 | 2710 | 33.3 |

The embodiment disclosed herein is illustrative and the invention according to the present disclosure is not limited to the above-described embodiment. That is, the scope of the invention according to the present disclosure is defined by the terms of the claims, and is intended to include any modifications within the scope and meaning equivalent to the terms of the claims. Various variations and modifications are also possible within the above-described scope.

For example, various variations and modifications are possible within the scope of the present invention, in terms for example of the number of layers of the dielectric layers and the internal electrode layers that form the multilayer body, and the materials of the dielectric layers and the internal electrode layers. Although the multilayer ceramic capacitor has been described as an example of the multilayer electronic component, the invention according to the present disclosure is not limited thereto and is also applicable to, for example, a capacitor element formed within a multilayer board.

What is claimed is:

1. A multilayer electronic component comprising:
a multilayer body including a plurality of stacked dielectric layers and a plurality of internal electrode layers interposed between adjacent dielectric layers of the plurality of stacked dielectric layers, wherein
each of the plurality of stacked dielectric layers has a plurality of crystal grains including a perovskite-type compound containing Ba, a first rare earth element, and a second rare earth element,
a difference between a positive trivalent ion radius of the first rare earth element and a positive divalent ion radius of Ba is smaller than a difference between a positive trivalent ion radius of the second rare earth element and the positive divalent ion radius of Ba,
at least a part of the plurality of crystal grains have a first region located along a grain boundary of a crystal grain and a second region located in a center portion of the crystal grain, and
a sum of an amount of the first rare earth element and an amount of the second rare earth element in the first region is larger than a sum of an amount of the first rare earth element and an amount of the second rare earth element in the second region, and
wherein the sum of the amount of the first rare earth element and the second rare earth element in the first region is not less than 2 atm % relative to 100 atm % of Ti in the perovskite compound, and the sum of the amount of the first rare earth element and the second rare earth element in the second region is less than 2 atm % relative to 100 atm % of the Ti in the perovskite-type compound.

2. The multilayer electronic component according to claim 1, wherein the first region includes a first portion where the amount of the first rare earth element is larger than the amount of the second rare earth element, and a second portion where the amount of the second rare earth element is larger than the amount of the first rare earth element.

3. The multilayer electronic component according to claim 1, wherein the positive trivalent ion radius of the second rare earth element is smaller than the positive trivalent ion radius of the first rare earth element.

4. The multilayer electronic component according to claim 1, wherein the first and second rare earth elements are not uniformly contained in a solid solution state throughout the crystal grain.

5. The multilayer electronic component according to claim 1, wherein the sum of the amount of the first rare earth element and the second rare earth element in the first region is at least 1.2 times as large as the sum of the amount of the first rare earth element and the second rare earth element in the second region.

6. A method for manufacturing a multilayer electronic component, the method comprising:
obtaining a plurality of pre-sintered dielectric layers using a first powder, the first powder including a first perovskite-type compound powder containing Ba, and a compound of a first rare earth element;
forming pre-sintered internal electrode layers on the pre-sintered dielectric layers using a paste, the paste including an electrically conductive powder and a second powder, the second powder including a second perovskite-type compound powder containing Ba, and a compound of a second rare earth element;
stacking the plurality of pre-sintered dielectric layers having the pre-sintered internal electrode layers formed thereon to obtain a pre-sintered multilayer body; and
sintering the pre-sintered multilayer body so as to cause a reaction between the first powder and the second powder and obtain a multilayer body including a plurality of stacked dielectric layers and a plurality of internal electrode layers interposed between adjacent dielectric layers of the plurality of stacked dielectric layers, where each of the plurality of dielectric layers has a plurality of crystal grains including a perovskite-type compound containing Ba, the first rare earth element and the second rare earth element, wherein
a difference between a positive trivalent ion radius of the second rare earth element and a positive divalent ion radius of Ba is larger than a difference between a positive trivalent ion radius of the first rare earth element and the positive divalent ion radius of Ba, at least a part of the plurality of crystal grains have a first region located along a grain boundary of a crystal grain and a second region located in a center portion of the crystal grain, and a sum of an amount of the first rare earth element and an amount of the second rare earth element in the first region is larger than a sum of an amount of the first rare earth element and an amount of the second rare earth element in the second region, and the sum of the amount of the first rare earth element and the second rare earth element in the first region is not less than 2 atm % relative to 100 atm % of Ti in the perovskite compound, and the sum of the amount of the first rare earth element and the second rare earth element in the second region is less than 2 atm % relative to 100 atm % of the Ti in the perovskite-type compound.

7. The method for manufacturing a multilayer electronic component according to claim 6, wherein the first region includes a first portion where the amount of the first rare earth element is larger than the amount of the second rare earth element, and a second portion where the amount of the second rare earth element is larger than the amount of the first rare earth element.

8. The method for manufacturing a multilayer electronic component according to claim 6, wherein the positive trivalent ion radius of the second rare earth element is smaller than the positive trivalent ion radius of the first rare earth element.

9. The method for manufacturing a multilayer electronic component according to claim 6, wherein the first rare earth element is Gd and the second rare earth element is Dy.

10. The method for manufacturing a multilayer electronic component according to claim 6, wherein the first and second rare earth elements are not uniformly contained in a solid solution state throughout the crystal grain.

11. The method for manufacturing a multilayer electronic component according to claim 6, wherein the sum of the amount of the first rare earth element and the second rare earth element in the first region is at least 1.2 times as large as the sum of the amount of the first rare earth element and the second rare earth element in the second region.

* * * * *